United States Patent [19]
Rhoades

[11] Patent Number: 6,023,941
[45] Date of Patent: Feb. 15, 2000

[54] HORIZONTAL CARBON DIOXIDE SNOW HORN WITH ADJUSTMENT FOR DESIRED SNOW

[75] Inventor: George D. Rhoades, La Grange, Ill.

[73] Assignee: Praxair Technology, Inc., Danbury, Conn.

[21] Appl. No.: 09/120,280

[22] Filed: Jul. 22, 1998

[51] Int. Cl.[7] .................................................. F17C 7/02
[52] U.S. Cl. ............................... 62/603; 62/52.1; 62/908
[58] Field of Search .................................. 62/60.3, 51.1, 62/52.1, 908

[56] References Cited

U.S. PATENT DOCUMENTS

| | | |
|---|---|---|
| 2,493,759 | 1/1950 | Freygang .................................. 62/603 |
| 2,791,104 | 5/1957 | Duz .......................................... 62/51.1 |
| 3,667,242 | 6/1972 | Kilburn ....................................... 62/10 |
| 4,015,440 | 4/1977 | Pietrucha et al. ......................... 62/166 |
| 4,375,755 | 3/1983 | Barbini et al. ............................ 62/330 |
| 4,415,346 | 11/1983 | Love ........................................... 62/35 |
| 4,652,287 | 3/1987 | Allen et al. ................................. 62/35 |
| 5,749,232 | 5/1998 | Sauer ........................................ 62/908 |

*Primary Examiner*—Ronald Capossela
*Attorney, Agent, or Firm*—Donald T. Black

[57] ABSTRACT

A method and apparatus is provided herein to produce solid $CO_2$ from liquid $CO_2$ wherein the solid $CO_2$ may be adjusted for level of agglomeration and can be continuously delivered through a snow horn in a horizontal or substantially horizontal orientation. The invention finds particular use in confined spaces such as between a freezer infeed conveyor and the freezer conveyor.

18 Claims, 5 Drawing Sheets

HORIZONTAL CARBON DIOXIDE SNOW HORN WITH ADJUSTMENT FOR DESIRED SNOW

FIELD OF THE INVENTION

The present invention relates to $CO_2$ snow horns used in refrigeration systems and, in particular, to a method and apparatus for producing solid $CO_2$ snow from liquid $CO_2$.

DESCRIPTION OF RELATED ART

Liquid carbon dioxide exists at any temperature between the triple point temperature of $-56.6°$ C. and the critical point temperature of $31°$ C. by compressing the carbon dioxide to the liquefaction pressure. At a temperature of from about $0°$ C. to $30°$ C., the liquefaction pressure is 505.4 psia (3.48 MPa) to 1045.8 psia (7.21 MPa). Liquid carbon dioxide used as a refrigerant, is generally maintained above the triple point pressure of 74.7 psia (0.52 MPa) and is subjected to a pressure drop to convert it to solid snow particles at a temperature of about $109°$ F. ($42.8°$ C.). Presently available apparatus for creating liquid carbon dioxide snow generally utilizes an orifice for the snow producing pressure drop. A tube, usually having an expanding area, is used around the orifice to protect the snow from vaporization by warm air on its way to the use point. This tube is referred to as a "snow horn". Snow horns using present state-of-the-art orifice injection are positioned to discharge downwardly from a vertical orientation to freeze products, for example, between a freezer infeed conveyor and the freezer conveyor. They require considerable vertical distance such that excessive conveyor length is required to convey the infeed product back down to the freezer belt without product damage. When these horns are tilted to reduce the height requirement, they generally accumulate frost and often are not able to reliably discharge the created $CO_2$ snow. Unreliable snow delivery usually means uneven product cooling and less customer satisfaction. Further, the orifice expansion and accompanying high velocity snow and vapor stream is accompanied by a high pitch sound which is irritating to most operators.

The prior art has not successfully solved the aforementioned problems. Some have tried orifice plugs drilled with holes on a diameter of the snow horn to create a strong downward flow down the inside surface the horn, as disclosed in U.S. Pat. No. 4,415,346. Others have drilled orifice holes off-center of the diameter in order to create a swirl pattern down the inside surface of the horn, as disclosed in U.S. Pat. No. 3,667,242.

Jacketing the snow horn with incoming liquid has been done primarily in an attempt to improve the amount of snow produced, as disclosed in U.S. Pat. Nos. 4,015,440 and 3,667,242. These snow horns have the same orifice type of injection as other prior art devices, but have been found to be less sensitive to blockage because of the warmer liquid temperature on the inside surface of the horn. This type of horn tends to be more expensive than a nonjacketed horn, and it is not as effective in converting more snow since some of the snow converted is lost in cooling the incoming carbon dioxide liquid.

Various schemes for reducing $CO_2$ snow velocity have been tried. Kinetic energy is claimed to have been absorbed by multiple converging injection, however, evidence of success is lacking. In such known attempts, as described in U.S. Pat. No. 4,652,287 conventional expanding area snow horns are ultimately used. U.S. Pat. No. 4,375,755 describes a snow horn utilizing the addition of ambient air to assist in clearing the generated solid carbon dioxide out of the snow horn. Moisture condensed from the air as the air is cooled has been found to soon create water ice on the horn surface where the surface temperature is $32°$ F. or lower. This leads to altered flow pattern and eventually to blockage of the horn.

Accordingly, there is a long-felt need for a reliable continuous operation snow horn for use in confined spaces such as between a freezer infeed conveyor and the freezer conveyor. The prior art snow horns have generally stressed operating in as close to the vertical position as possible, and none of the known prior art has obtained reliable continuous operating in the horizontal or slightly upwardly tilted position. This means that, in a belt snowing application, the product infeed conveyor must be sufficiently high over the freezer belt to accommodate the horn height in a vertical orientation. Since the product to be frozen must be gently placed on the freezer belt to prevent product damage, costly conveyor length is needed to bring the product back down to the freezer belt. Further, none of the prior art has addressed the noise level of an orifice expansion.

Bearing in mind the problems and deficiencies of the prior art, it is therefore an object of the present invention to provide a reliable, continuously operable snow horn for use in confined spaces such as between a freezer infeed conveyor and the freezer conveyor.

It is another object of the present invention to provide a snow horn which provides reliable, continuous operation in a horizontal or slightly upwardly tilted orientation.

A further object of the invention is to provide a snow horn for producing solid carbon dioxide which lessens noise levels during operation.

It is yet another object of the present invention to provide such a snow horn which is adjustable to vary the degree of agglomeration of the carbon dioxide snow.

Still other objects and advantages of the invention will be apparent from the specification.

SUMMARY OF THE INVENTION

The above and other objects and advantages, which will be apparent to one of skill in the art, are achieved in the present invention which is directed to a method and apparatus for producing solid $CO_2$ from $CO_2$ in a liquid form in which the apparatus comprises an inlet tube for receiving a flow of liquid $CO_2$, an outlet tube having a cross-section larger than said inlet tube for dispensing solid $CO_2$, and a porous member disposed within the apparatus having a plurality of continuous, linked passages for the expansion of liquid $CO_2$ to produce solid $CO_2$. As contemplated, the inlet tube and outlet tube are connected in such a manner that the inlet tube discharge end is adjustable for length of extension into the outlet tube.

It is further contemplated that the outlet tube is disposed at a non-vertical angle in use, and preferably horizontal or substantially horizontal. Means are provided to produce solid $CO_2$ when the outlet tube is in a horizontal or substantially horizontal orientation.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

Figure 1:
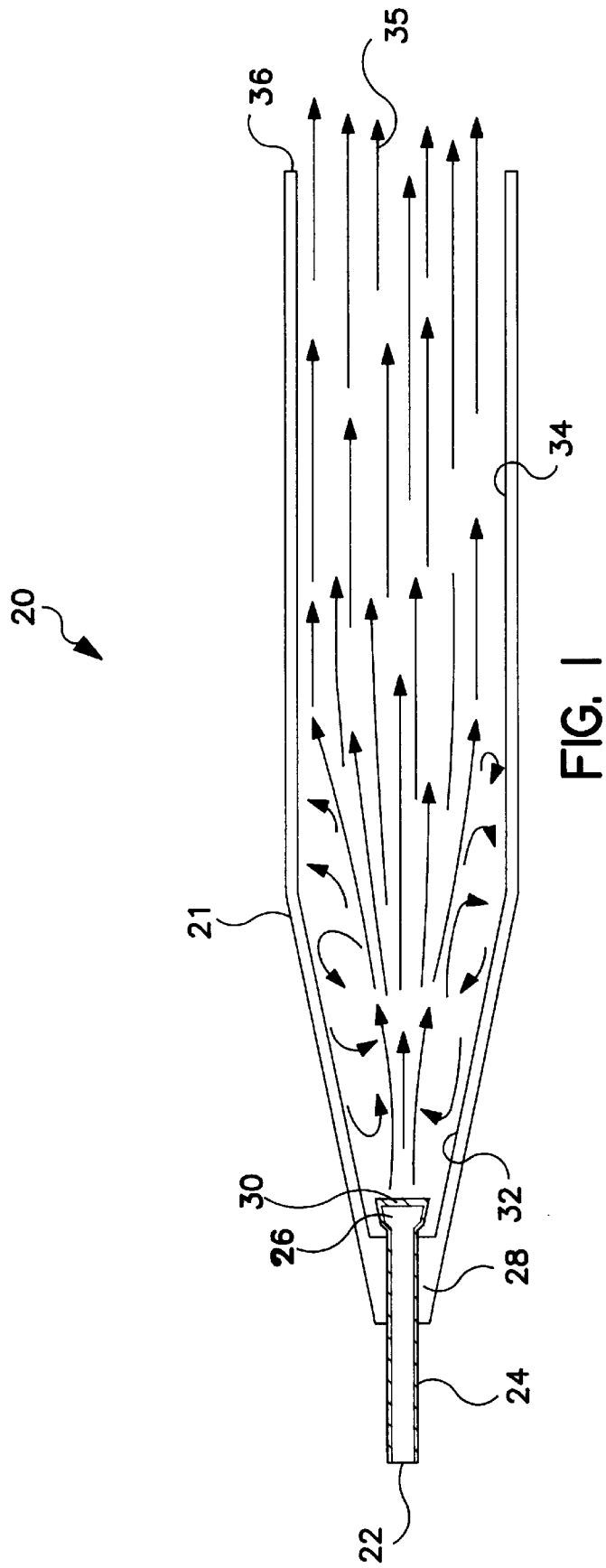
FIG. 1 is a side elevational view in cross-section of a first embodiment of the snow horn of the present invention in which a porous disk member inside the agglomeration section is in a retracted position.

In describing the preferred embodiment of the present invention, reference will be made herein to FIGS. 1–9 of the drawings in which like numerals refer to like features of the invention. Features of the invention are not necessarily shown to scale in the drawings.

It has been found that snow horns may be made to operate reliably, efficiently and continuously in a horizontal or other non-vertical position by the use of a porous material to provide the pressure drop to produce the dry ice (carbon dioxide) snow. The porous member material may be any material which provides multiple, fine, continuous expansion paths, preferably more than two such paths. Non-limiting examples of such materials include sintered metals, porous ceramics, and plastics. Such materials may be in the form of fibrous pads such as metal wool, or solids such as metal having multiple drilled holes. As contemplated, the openings of the paths have diameters or sizes of about 300 microns, preferably in the range of about $200\mu$–$300\mu$ diameters and more preferably less than about $200\mu$. Each flow path will have a very small diameter and therefore a much lower flow capacity per flow path than conventional orifice expansion systems. While the total of these small expansion paths matches the total liquid $CO_2$ flow of a conventional orifice expansion, it has been unexpectedly found that there is considerably less irritating noise produced by the snow horn using the present invention than that of a snow horn using conventional orifice expansion.

Figure 2:
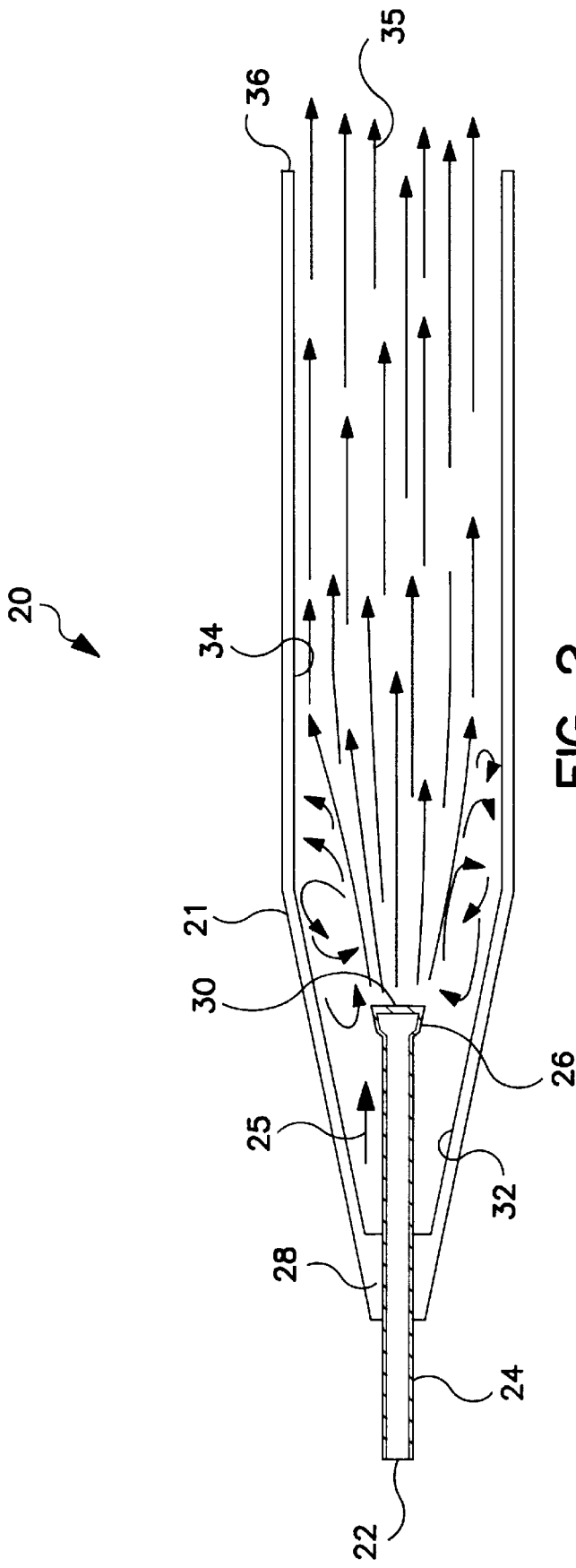
FIG. 2 is a side elevational view in cross-section of the embodiment of FIG. 1 in which a porous disk member inside the agglomeration section is in an extended position.

A first embodiment of the apparatus of the present invention is depicted in FIGS. 1 and 2. The components described herein are generally made of materials such as polyethylene, polycarbonate, Teflon or stainless steel, unless otherwise mentioned. The apparatus 20 has an inlet 22 in inlet conduit or tube 24 for receiving the liquid carbon dioxide. Inlet tube 24 passes through the inlet end 28 of longitudinally extending snow horn outlet tube or housing 21, and is adjustable for length of extension into the housing, as will be discussed further below. Tube 24 has disposed within it a porous material, here shown in the form of a round, porous disk 30 having opposed flat sides and received within a comparable shaped section adjacent inlet discharge end 26. The porous disk in the inlet tube discharge end forms a nozzle within the funnel- or cone-shaped diverging wall portion 32 of the snow horn. An extended portion 34 of the snow horn has straight, non-diverging walls and links the diverging portion 32 to the outlet end or skirt 36. The snow horn housing 21 may be circular or polygonal in end view (not shown). In any instance, the outlet end 36 which discharges the solid carbon dioxide snow is considerably larger in cross-section than the inlet 22 for the liquid carbon dioxide. Outlet 36 is exposed to ambient temperature and pressure and directs the carbon dioxide snow against the product to be chilled or frozen.

The snow horn has two functional sections - an agglomeration section, closest to the point of injection, corresponding to the diverging portion 32, and a straightening section, corresponding to the extended portion 34, which is toward the exit end 36 for the carbon dioxide snow. The snow horn is designed to be adjustable as shown in FIGS. 1 and 2 to take advantage of the Bernoulli effect. In FIG. 1 the inlet tube is shown in the fully retracted position, with the discharge end 26 completely to the rear at the narrowest part of the diverging section, while in FIG. 2 the inlet tube is shown in the fully extended position in the direction shown by arrow 25, with the discharge end 26 at a wider part of the diverging portion. The inside of the horn is configured so that when the point of injection is at the rear of the horn (FIG. 1), a softer snow in larger clusters is obtained. Then when the point of injection is moved forward (FIG. 2), the snow particles will be smaller and more dense.

In operation, liquid carbon dioxide is flowed into inlet 22 and passed through the multiple fine passageways of porous disk member 30, whereupon it undergoes a pressure drop and is injected into horn or outlet tube 21 as a mixture of solid and vapor. While not wishing to be bound by theory, it is believed that in the agglomeration section the vapor volume around higher velocity injection stream will be drawn to the higher velocity stream. The void in this area will then be filled by part of the higher velocity stream causing recirculation. The amount of recirculation will define the texture of the snow. The straightening section allows the flow to become more laminar and maintain an even exit pressure to minimize the intrusion of surrounding atmosphere.

When the injection point is to the rear of the horn (FIG. 1) there is a minimum of still vapor around the higher velocity of the $CO_2$ snow and vapor stream. In such a configuration, there would be a minimum of recirculation. This minimum circulation minimizes the amount of agglomeration and the exiting snow would have larger clumps of softer snow. When the injection point is moved inward away from the back of the horn (FIG. 2), the injected plume does not fit as well to the inside surface of the horn and a larger amount of "still" vapor is present around the higher velocity injection stream. In this configuration, there is more recirculation and the $CO_2$ snow becomes more granular having smaller more dense particles. Again, as the snow passes into the straightening zone the flow evens to present a more laminar flow to prevent the intrusion of surrounding atmosphere.

Figure 3:
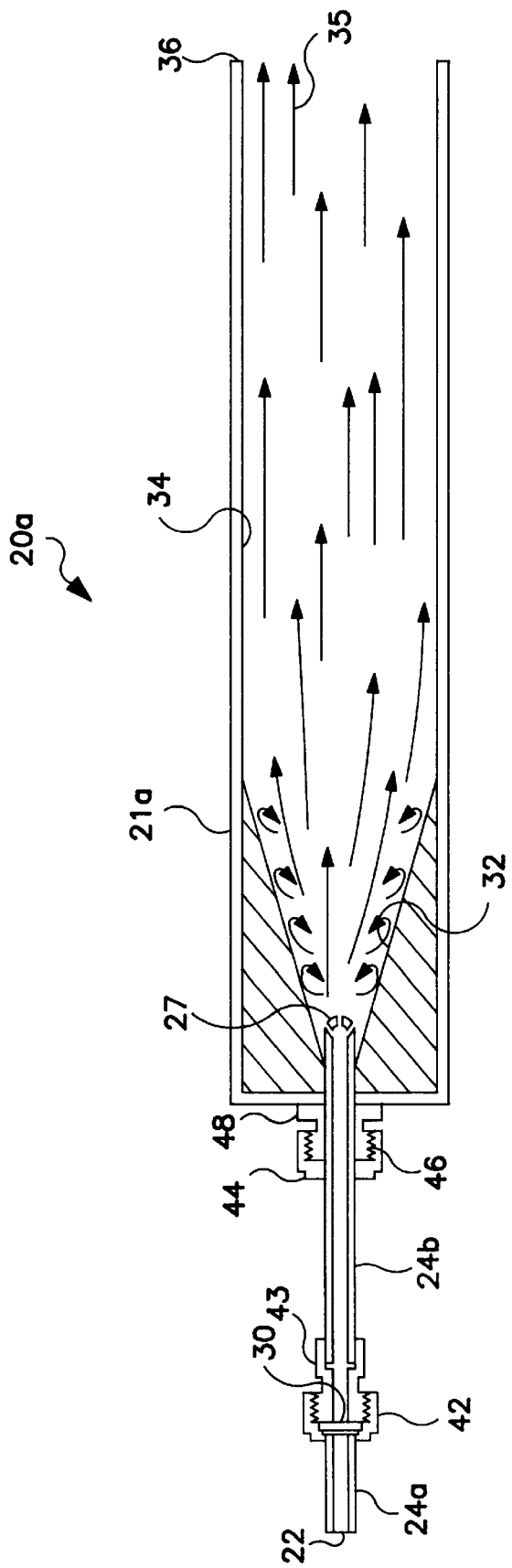
FIG. 3 is a side elevational view in cross-section of a second embodiment of the snow horn of the present invention in which a porous disk member is outside the agglomeration section and the liquid carbon dioxide discharge tube is in a retracted position.
Figure 3A:
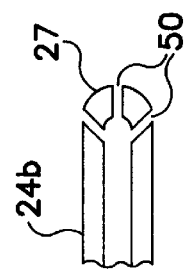
FIG. 3a is a close up side elevational view in cross section of the discharge end of the inlet tube shown in FIG. 3.
Figure 4:
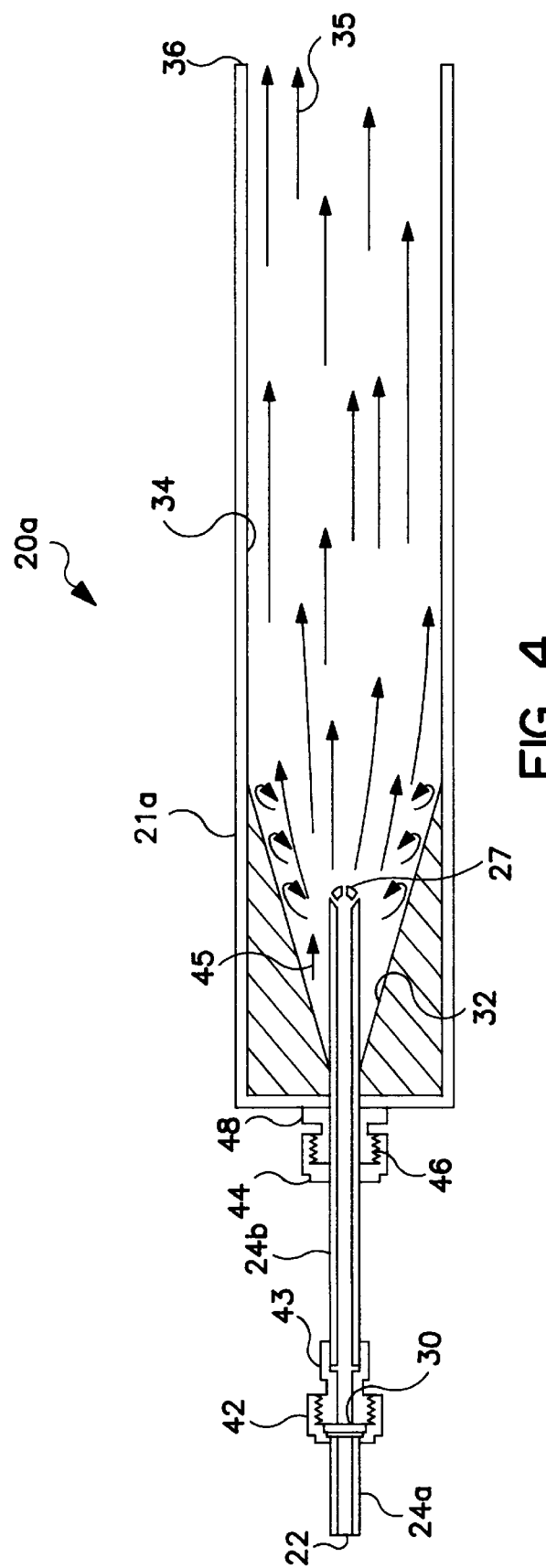
FIG. 4 is a side elevational view in cross-section of the embodiment of FIG. 3 in which a porous disk member is outside the agglomeration section and the liquid carbon dioxide discharge tube is in an extended position.

Another embodiment of the snow horn of the present invention is depicted in FIGS. 3–6. Although the exterior of outlet tube or housing 21a is shown as cylindrical, the interior again contains diverging agglomerating section 32 and straightening section 34 leading to outlet 36. However, instead of the porous member 30 being disposed adjacent to the inlet tube discharge end 27, member 30 is disposed between complimentary fitting portions 42 and 43 connecting inlet tube portions 24a and 24b, and is external to snow horn housing 21a. Thus, after entering inlet 22 the pressure drop to, and expansion of, the liquid carbon dioxide occurs initially before the carbon dioxide reaches the inlet tube discharge nozzle 27. As seen in FIG. 3a, nozzle 27 includes a plurality of diverging orifices 50 for a second expansion this time of the carbon dioxide solid and vapor mixture.

A fitting 44 mates to housing inlet 48 and captures a soft ferrule 46 which seals inlet tube portion 24b. By loosening fitting 44, inlet discharge nozzle 27 may be adjusted for length into the agglomeration section 32. As with the first embodiment, low carbon dioxide snow agglomeration occurs when the nozzle 27 is retracted to the back of agglomeration section 32 (FIG. 3). When the nozzle 27 is extended forward, a higher agglomeration is imparted to the snow particles.

Figure 5:
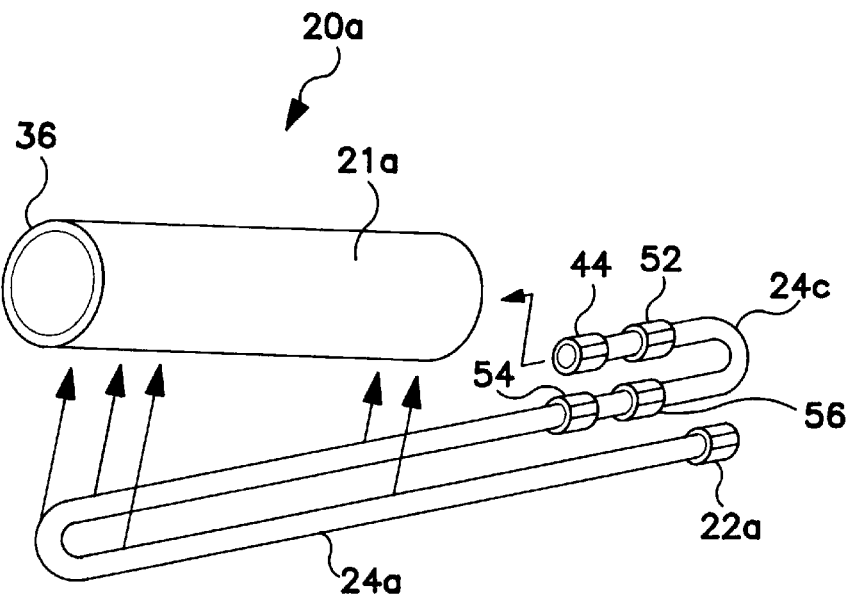
FIG. 5 is an exploded perspective view of a variation of the embodiment of FIG. 3 in which the liquid carbon dioxide inlet is attached over the length of the snow horn.
Figure 6:
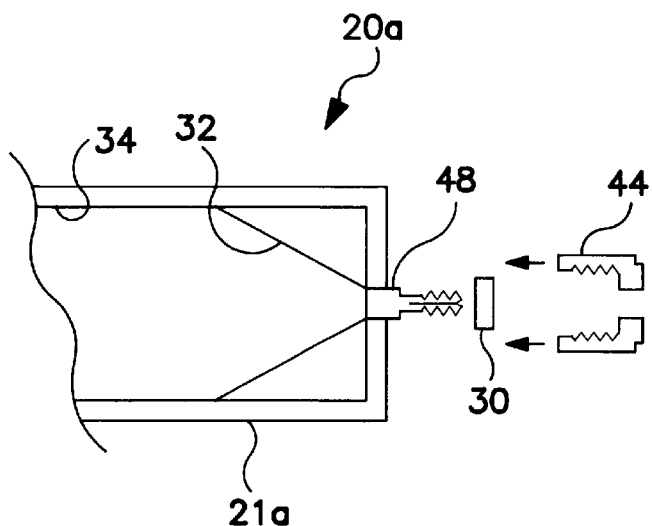
FIG. 6 is an exploded side elevational view in cross-section of the liquid carbon dioxide entrance end of the snow horn.
Figure 7:
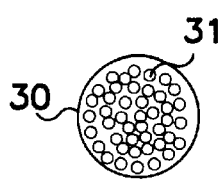
FIG. 7 is a front elevational view of the preferred porous disk utilized in the present innovation.

To maintain the temperature of the outlet end of the snow horn in a temperature range where $CO_2$ is a solid, as an added assurance of carbon dioxide snow discharge as desired, a portion of the liquid carbon dioxide inlet tube may be thermally secured along the length of housing 21a as shown in FIG. 5. The inlet liquid tube 24a may be soldered or strapped and then caulked with a suitable heat transfer compound, to assure heat flow coupling with the snow horn housing. Fittings 54, 56 connect tube portion 24c to tube portion 24b of FIGS. 3 and 4, which is itself connected to housing inlet 48 of FIGS. 3 and 4 by fitting 44. In this embodiment, the porous member 30 is disposed between fittings 44 and 43 of FIGS. 3 and 4. In this configuration, tube portion 24c may optionally be flexible to allow for adjustment of 24b.

Figure 8:
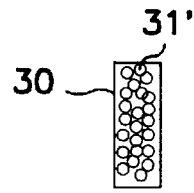
FIG. 8 is a side elevational view, in cross-section, of one embodiment of a porous disk of FIG. 7.
Figure 9:
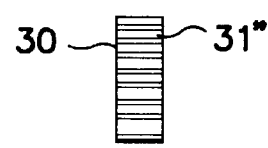
FIG. 9 is a side elevational view, in cross-section, of another embodiment of the porous disk of FIG. 7.

The means for passing the liquid $CO_2$ through a plurality of fine, continuous, linked passages and expanding it to produce snow may comprise a wide variety of configurations. As shown by way of the non-limiting example in FIG. 7 the preferred porous member is in the form of a round disk 30 having the multiple fine holes 31 across substantially all of the face of the disk. As shown in FIG. 8, such holes 31' can be in the form of continuous linked passages as would be produced by the interstitial spaces of a sintered metal, plastic or ceramic made initially from a powder, or by the spaces between the fibers of a fibrous material such as metal wool. Alternatively, as shown in FIG. 9, such holes 31" may be made by multiple drillings in the face of the disk, and extending completely therethrough.

The horn size and injection rate may be matched to provide an adequate rate to carry the snow produced out of the outlet 36 and to eliminate the intrusion of atmospheric air into the horn. This horn, operating in a horizontal or slightly upwardly tilted position (e.g., up to about 15° from horizontal), can be installed within a vertical height of 4 inches. This means a minimum of separation between the infeed conveyor and the freezer belt in a belt snowing application.

The snow horn of the present invention also has application where it is not desirable to have the horn located above the item to be cooled. An example of such an application would be cooling totes where dripping of the horn and piping frost melt is not desirable on the food product in the tote. Another application example is for cooling a product which is very fine or light, where the expansion vapor velocity of the present state-of-the-art snow horns would blow that material out of its container.

As a result of the aforedescribed structure and mode of operation, the present invention achieves the objects described previously. There is provided reliable operation when the snow horn is positioned in a horizontal or slightly upward position, which permits use in more confined space than previously possible. Further, the invention provides adjustment to produce a desired texture of the generated snow and provides a lower noise level of the expansion to produce the dry ice snow.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An apparatus for producing solid $CO_2$ from $CO_2$ in liquid form comprising:
   an inlet tube for receiving a flow of liquid $CO_2$;
   an outlet tube having a cross-section larger than said inlet tube for dispensing solid $CO_2$; and
   a porous member disposed within or at the discharge end of said inlet tube having a plurality of continuous, linked passages for the flow therethrough of liquid $CO_2$ and for the expansion of said liquid $CO_2$ to produce solid $CO_2$, wherein said inlet tube extends adjustably through said outlet tube at a first end of said outlet tube opposite from a second end of said outlet tube for discharge of solid $CO_2$, said inlet tube having a discharge end extending into said outlet Tube, and wherein the inlet tube discharge end is adjustable for length of extension into said outlet tube.

2. An apparatus of claim 1 wherein said porous member is disposed adjacent to the inlet tube discharge end.

3. An apparatus of claim 1 wherein said porous member is disposed between said inlet and said outlet tubes.

4. An apparatus of claim 1 wherein said porous member comprises a material selected from the group consisting of porous metals, ceramics and plastics.

5. An apparatus of claim 1 wherein said porous member comprises a disk having a plurality of passages of about $300\mu$ in diameter.

6. The apparatus of claim 1 wherein said porous member is disposed external to the outlet tube.

7. The apparatus of claim 1 wherein the inner cross-section of the outlet tube increases from the first end toward the second end.

8. The apparatus of claim 1 wherein said outlet tube comprises a snow horn.

9. The apparatus of claim 1 wherein the outlet tube is disposed at a non-vertical angle, and wherein said apparatus is adapted to produce solid $CO_2$ when said outlet tube is at such angle.

10. The apparatus of claim 9 wherein the outlet tube is disposed horizontally and wherein said apparatus is adapted to produce solid $CO_2$ when said outlet tube is horizontal.

11. The apparatus of claim 9 wherein the outlet tube is disposed at a non-vertical angle, and wherein the inlet tube is in thermal contact along a portion of a length thereof with said outlet tube.

12. The apparatus of claim 1 wherein said porous member comprises a disk having a plurality of passages having a diameter of about $200\mu$–$300\mu$.

13. The apparatus of claim 1 wherein said porous member comprises a disk having a plurality of passages having a diameter of less than about $200\mu$.

14. A method for producing solid $CO_2$ from $CO_2$ in liquid form comprising the steps of:
   a) providing a snow horn disposed at a non-vertical angle, said snow horn having an inlet tube for receiving a flow of liquid CO, and an outlet tube having a cross-section larger than said inlet tube for dispensing solid $CO_2$ wherein said inlet tube extends adjustably through said outlet tube at one end of said outlet tube, said inlet rube having a discharge end extending into said outlet tube and wherein the inlet Tube discharge end is adjustable for length of extension into said outlet tube;
   b) passing liquid $CO_2$ through the snow horn inlet tube; and
   c) passing said liquid $CO_2$ through a plurality of fine, continuous, linked passages within or at the discharge end of said inlet tube to expand the liquid $CO_2$ and produce solid $CO_2$ in the snow horn outlet tube.

15. The method of claim 14 wherein said plurality of fine, continuous, linked passages are within a porous member selected from the group consisting of porous metals, ceramics and plastics.

16. The method of claim 14 wherein said snow horn outlet tube has an inner cross-section that increases from the first end toward the second end.

17. The method of claim 14 further comprising means to maintain the temperature of the bottom of said outlet tube in the range at which $CO_2$ is a solid.

18. The method of claim 17 wherein said means comprises placing said inlet tube in thermal contact along a portion of a bottom length of said outlet tube.

\* \* \* \* \*